Patented July 2, 1929.

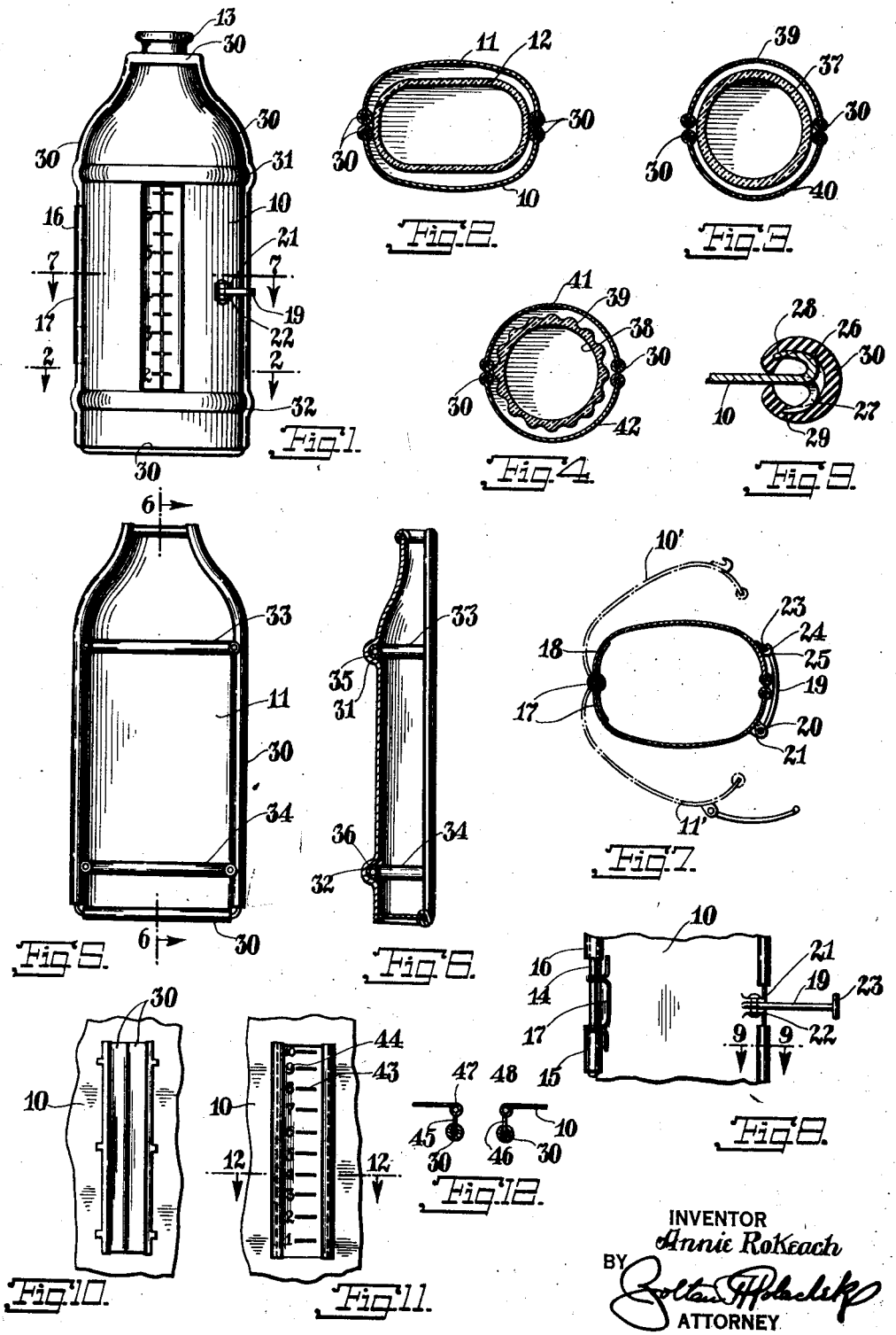

1,719,488

UNITED STATES PATENT OFFICE.

ANNIE ROKEACH, OF BROOKLYN, NEW YORK, ASSIGNOR OF ONE-HALF TO MICHAEL TURK.

SAFETY CONTAINER FOR BOTTLES.

Application filed February 23, 1928. Serial No. 256,116.

This invention relates to a new and useful device in the nature of a safety container for a baby's bottle especially adapted for the purpose of providing a means of protecting a baby's nursing bottle, preventing breakage of the said bottle.

The object of the invention is to provide a safety container of the class described of novel construction and arrangement of parts hereinafter more fully described, claimed and illustrated in the accompanying drawing.

Fig. 1 is a side elevational view of my improved safety container.

Fig. 2 is a transverse sectional view taken on the line 2—2 of Fig. 1.

Fig. 3 is a similar view to that shown in Fig. 2, illustrating another form of my improved device.

Fig. 4 is a similar view to that shown in Figs. 2 and 3, illustrating a further form of my improved device.

Fig. 5 is a side elevational detail view of one of the container members as embodied in my improved device.

Fig. 6 is a vertical sectional view taken on the line 6—6 of Fig. 5.

Fig. 7 is a transverse sectional view taken on the line 7—7 of Fig. 1.

Fig. 8 is a side elevational fragmentary view of my improved safety container, showing same in a disengaged open position.

Fig. 9 is an enlarged transverse sectional view taken on the line 9—9 of Fig. 8.

Fig. 10 is a fragmentary side elevational view of my improved device, illustrating in particular a further development thereof.

Fig. 11 is a similar view to that shown in Fig. 10, showing the enclosing member in an open position.

Fig. 12 is an enlarged transverse sectional view taken on the line 12—12 of Fig. 11.

As here embodied my improved safety container for a baby's bottle comprising a pair of container members 10 and 11, adapted to enclose or cover the nursing bottle 12, such as ordinarily used for nursing babies and which is provided with the usual nipple 13. The container members 10 and 11 are longitudinally disposed or positioned on the bottle 12, and are provided with a hinge consisting of the pin 14, engaged in the extended elements 15 and 16, respectively of the container members 10 and 11.

The container member 10 has formed therein an elongated vertical opening 43, adapted for the purpose of visualizing the graduation marks 44, affixed to the bottle 12, as a means of ascertaining the amount of milk in the bottle 12, without necessitating the removal of my improved safety container. The spring 16 is provided with extended elements 17 and 18, adapted to engage inside the container members 10 and 11, respectively, as a means of normally holding the said container members in an open position, as designated by the reference numerals 10' and 11'. The clip 19 is hinged as at 20 to the lug elements 21 and 22, of the container member 10. The clip 19 is provided with an enlarged free extremity 23, adapted to engage in an opening 24, formed in the lug element 25 of the container member 11, as a means of holding the said container members in a closed position as clearly shown in Fig. 7.

The sides, top and bottom of the said container members are provided with a plurality of extended elements 26 and 27 formed or bent oppositely, and provided with pointed extremities 28 and 29, respectively. The above described construction is such as will permit the said extremities of the said extended elements to engage the guard 30, of resilient material preferably molded rubber, or the like, formed in strips of semi-circular outer transverse contour and provided with a longitudinal opening, as a means of permitting the said guard to be engaged over the said extended elements. The container members 10 and 11, have formed therein, transverse extended or raised portions 31 and 32, formed transversely semi-circular adapted to receive the resilient tubular members 33 and 34, preferably of rubber, composition rubber or the like, co-axial on the rods 35 and 36 respectively, secured at their extremities to the edges of the said container members. The above described construction is such as will permit the bottle 12 to be supported by the said resilient members 33 and 34.

In Figs. 3 and 4 of the accompanying drawing, I have illustrated nursing bottles 37 and 38, respectively, of hollow circular transverse cross section. The bottle 38 having its outer surface formed rough or corrugated, as at 39. It is to be understood that the container members 39, 40, 41 and 42, are suitably formed so as to engage the said bottles 37 and 38, respectively.

In Figs. 10, 11 and 12, I have shown enclosing members 45 and 46, adapted to enclose or cover the above mentioned opening 43, formed in the container member 10. The enclosing members 45 and 46 are hinged as at 47 and 48, respectively to the container member 10, at the sides of the said opening formed therein. The above mentioned guards 30 are secured to the free edges of the enclosing members, similarly as above set forth. The above described construction is such as will permit the said guards to protect the portion of the bottle 12, exposed by the opening 43, when the said enclosing members are open or closed.

Having thus described my invention what I claim as new and desire to secure by United States Letters Patent is:

1. In a device of the class described, the combination with container members of extended elements projecting from the edges thereof and bent in opposite directions, and provided with pointed extremities, and resilient material guards having longitudinal openings engaged upon the said extended elements for forming finished edges.

2. In a device of the class described, the combination with container members, of resilient material guards having longitudinal openings, extended elements projecting from the edges of the said container members, and bent in opposite directions, and the said guards being engaged on the extended elements for forming finished edges on the container members.

In testimony whereof I have affixed my signature.

ANNIE ROKEACH.